United States Patent
Monna et al.

(10) Patent No.: US 10,428,717 B2
(45) Date of Patent: Oct. 1, 2019

(54) METHOD FOR DIAGNOSING DEGRADATION IN CATALYST

(71) Applicant: NGK INSULATORS, LTD., Nagoya-shi, Aichi (JP)

(72) Inventors: Kosuke Monna, Aichi (JP); Taku Okamoto, Nagoya (JP); Noriko Hirata, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 36 days.

(21) Appl. No.: 15/640,683

(22) Filed: Jul. 3, 2017

(65) Prior Publication Data

US 2018/0010506 A1    Jan. 11, 2018

(30) Foreign Application Priority Data

Jul. 5, 2016  (JP) .................................. 2016-132955

(51) Int. Cl.
*F01N 3/10*    (2006.01)
*F01N 11/00*    (2006.01)

(52) U.S. Cl.
CPC .............. *F01N 11/002* (2013.01); *F01N 3/10* (2013.01); *F01N 3/103* (2013.01); *F01N 11/00* (2013.01); *F01N 11/007* (2013.01); *F01N 2550/02* (2013.01); *F01N 2560/02* (2013.01); *F01N 2560/026* (2013.01); *F01N 2560/06* (2013.01); *F01N 2900/0416* (2013.01); *Y02T 10/47* (2013.01)

(58) Field of Classification Search
CPC . F01N 3/10; F01N 3/103; F01N 11/00; F01N 11/002; F01N 11/007; F01N 2550/02; F01N 2560/02; F01N 2560/026; F01N 2560/06; F01N 2900/0416; Y02T 10/47
See application file for complete search history.

(56) References Cited

U.S. PATENT DOCUMENTS 5,290,530 A * 3/1994 Muramatsu .......... B01D 53/945
                                                    423/213.2
5,296,196 A    3/1994 Takeshima
(Continued)

FOREIGN PATENT DOCUMENTS

EP    1154131 B1    2/2005
JP    2876793 B2    3/1999
(Continued)

*Primary Examiner* — Audrey K Bradley
(74) *Attorney, Agent, or Firm* — Mattingly & Malur, PC

(57) ABSTRACT

Provided is a method for diagnosing whether an oxidation catalyst has degraded, based on an output value from one diagnostic sensor with higher accuracy. When a ratio of nitrogen monoxide that is oxidized by a catalyst and discharged downstream of the catalyst as nitrogen dioxide, with respect to nitrogen monoxide contained in an exhaust gas supplied upstream of the catalyst in an exhaust path is defined as a NO conversion rate, a diagnostic sensor configured to output an electromotive force corresponding to the NO conversion rate as a diagnostic output is provided downstream of the catalyst in the exhaust path, and whether the catalyst has degraded beyond an acceptable limit is diagnosed by comparing the diagnostic output with a threshold value predetermined depending on a temperature of the catalyst.

5 Claims, 6 Drawing Sheets

(56) References Cited

U.S. PATENT DOCUMENTS

| | | | |
|---|---|---|---|
| 9,551,260 B2 | 1/2017 | Kakimoto | |
| 2010/0161242 A1* | 6/2010 | Wang | G01N 27/4074 |
| | | | 702/24 |
| 2014/0060007 A1* | 3/2014 | Bedford | F01N 3/206 |
| | | | 60/274 |
| 2014/0060012 A1* | 3/2014 | Kakimoto | F01N 11/00 |
| | | | 60/277 |
| 2016/0356199 A1 | 12/2016 | Kakimoto | |

FOREIGN PATENT DOCUMENTS

| | | |
|---|---|---|
| JP | 2001-263048 A | 9/2001 |
| JP | 2005-240716 A | 9/2005 |
| JP | 2010-156243 A | 7/2010 |
| JP | 2012-036860 A | 2/2012 |
| JP | 2014-62541 A | 4/2014 |

* cited by examiner

F I G. 1
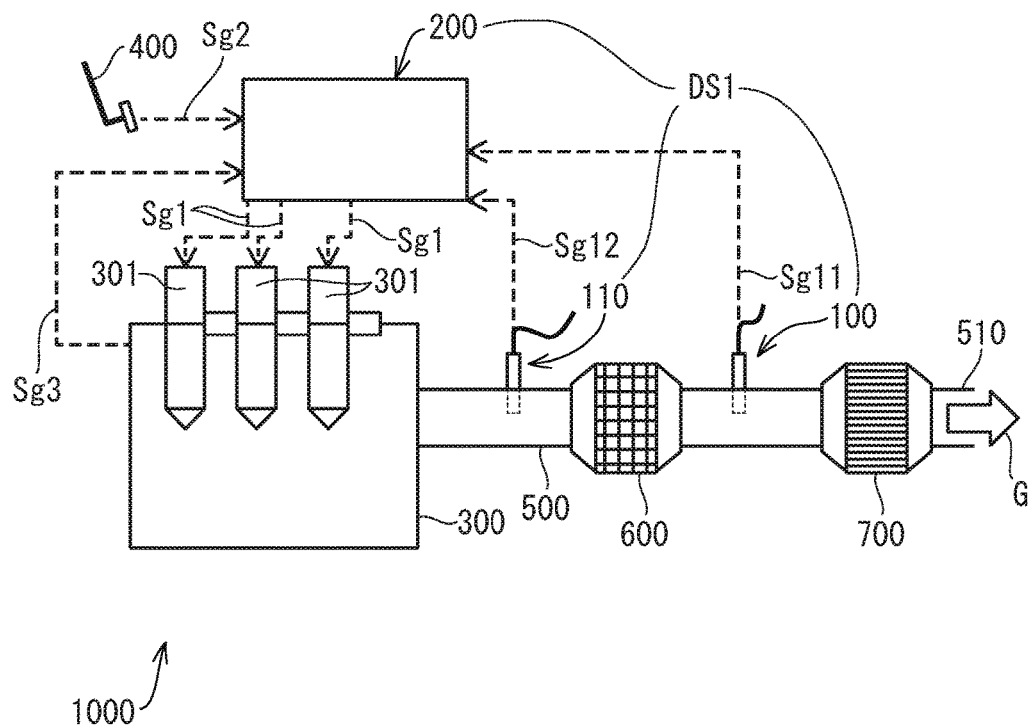

METHOD FOR DIAGNOSING DEGRADATION IN CATALYST

BACKGROUND OF THE INVENTION

Field of the Invention

The present invention relates to a method for diagnosing a degree of degradation in a catalyst that oxidizes a predetermined gas component such as nitrogen monoxide.

Description of the Background Art

Conventionally, for on-board diagnostics (OBD) of an exhaust gas cleaning system for vehicles, that is, the function of diagnosing whether a catalyst acts normally or not in the system, a large number of patent applications have been filed mainly by auto companies. Most of these patent applications relate to techniques using an exhaust gas temperature sensor, an oxygen sensor, a wide-range oxygen concentration sensor ($\lambda$ sensor), a $NO_x$ sensor, or a PM sensor, and are targeted for three-way catalysts, oxidation catalysts, $NO_x$ storage catalysts, $NO_x$ selective reduction catalysts, and diesel particulate filters (DPFs) (for example, see Japanese Patent Application Laid-Open Nos. 2001-263048, 2005-240716, 2012-036860, 2014-62541, and 2010-156243, and Japanese Patent No. 2876793).

Among these, for the OBDs targeted for diesel oxidation catalysts (DOCs), a variety of techniques using various existing sensors such as a temperature sensor, an $O_2$ sensor, a $\lambda$ sensor, a $NO_x$ sensor, and a pH sensor individually or in combination are known at present (for example, see Japanese Patent Application Laid-Open Nos. 2001-263048, 2005-240716, 2012-036860, 2014-62541, and 2010-156243). Specifically, diagnosing techniques using, as indicators, the heat of reaction of a hydrocarbon and oxygen on a catalyst, change in temperature of an oxidation catalyst, an oxygen storage capacity (OSC), a $NO/NO_2$ ratio, and an $NO_2$ ratio in $NO_x$, for example are known.

The techniques disclosed by Japanese Patent Application Laid-Open Nos. 2001-263048, 2005-240716, 2012-036860, 2014-62541, and 2010-156243 all relate to indirect evaluation of an oxidation ability of a diesel oxidation catalyst. Here, there are problems with poor diagnosis accuracy. Furthermore, using a plurality of sensors complicates the system, thus causing a problem with increased cost.

For example, disclosed in Japanese Patent Application Laid-Open No. 2001-263048 is a technique involving the use of a relationship that when the ability of converting (oxidizing or combusting) an unburned hydrocarbon in an oxidation catalyst decreases, exothermic energy will also decrease. In outline, a temperature difference $\Delta T$ is measured, which occurs at the time of fuel injection in exhaust gas temperature sensors disposed forward and backward (upstream and downstream) of an oxidation catalyst in an exhaust path, and the degree of degradation in the ability of converting (oxidizing or combusting) an unburned hydrocarbon in the oxidation catalyst is diagnosed indirectly from a measurement value.

In this method, however, a cause of error may be excessively large due to changes in the temperature and the flow rate of an exhaust gas when the gas sensors are practically used, and fuel consumption may inevitably degrade because a large amount of fuel injection is required for accelerating heat generation.

Disclosed in Japanese Patent Application Laid-Open No. 2005-240716 is a technique involving the use of a fact that when the ability of converting an unburned hydrocarbon in an oxidation catalyst decreases, the amount of oxygen consumed during the combustion of oxygen changes. In outline, on the basis of a difference $\Delta\lambda$ between output values $\lambda F$ and $\lambda R$ of two wide-range oxygen concentration sensors ($\lambda$ sensors) disposed forward and backward of an oxidation catalyst in an exhaust path, or a difference between output values (electromotive force values) of two oxygen sensors, an amount of oxygen consumed in an oxidation catalyst is measured, and the degree of degradation in the ability of converting an unburned hydrocarbon on the oxidation catalyst is diagnosed indirectly from a change in the measured value.

However, the concentration of oxygen in a diesel exhaust that is an excessive $O_2$ atmosphere is approximately 10% (=100000 ppm), whereas the amount (concentration) of hydrocarbon that is converted (oxidized or combusted) by an oxidation catalyst is normally on the order of several hundreds of ppm, and the amount (concentration) of oxygen consumed when such a trace amount of hydrocarbon is burned is no more than several hundreds of ppm. This means that the diagnosis of the degradation in an oxidation catalyst with an air-fuel ratio sensor or oxygen sensor requires an accurate calculation of $\Delta\lambda$ or a difference in electromotive force corresponding to a ppm-order change in the amount of oxygen consumed, but the air-fuel sensors and oxygen sensors originally cannot achieve such accuracy in measurements.

Even when an unburned hydrocarbon with a concentration of several thousands to several tens of thousands of ppm is produced by an intentional fuel injection, in principle, the sensors disposed forward and backward of an oxidation catalyst do not have any difference in output.

Disclosed in Japanese Patent Application Laid-Open No. 2012-036860 is a technique for determining a degree of degradation in an oxidation catalyst that oxidizes NO to $NO_2$, using an $NO_2$ value obtained based on a ratio of $NO_x$ values measured upstream and downstream of the oxidation catalyst in an exhaust path. More specifically, the techniques disclosed by Japanese Patent Application Laid-Open No. 2012-036860 are broadly distinguished into two, in one of which the upstream $NO_x$ value is obtained based on a predetermined map and the other of which the upstream $NO_x$ value is obtained by a $NO_x$ sensor. In both of the techniques, the downstream $NO_x$ value is measured by the $NO_x$ sensor.

However, in both of the techniques, there is a problem with low diagnosis accuracy, since the degree of degradation in the oxidation catalyst is determined based on a ratio of the two $NO_x$ values. Particularly in the former technique, since an estimated value is used as a $NO_x$ value for the exhaust immediately after a discharge of an engine or factors except for an engine speed and an engine load are not taken into account in setting of such an estimated value, it is conceivable that the accuracy of estimation will degrade remarkably depending on usage condition.

Disclosed in Japanese Patent Application Laid-Open No. 2014-62541 is a technique in which a $NO_2$ ratio ($NO_2$ concentration/NO concentration) is obtained using a multi-gas sensor including both a $NO_x$ detection part and a $NO_2$ detection part and a degree of degradation in an oxidation catalyst is determined based on the $NO_2$ ratio.

However, there is a problem that such a multi-gas sensor has a complicated structure due to including a plurality of sensing electrodes and therefore it is expensive.

Disclosed in Japanese Patent Application Laid-Open No. 2010-156243 is a technique for determining a $NO_2$ ratio in NOx, based on a $NO_2$ concentration in the exhaust that is measured by a $NO_x$ sensor and on pH of a condensate liquid obtained by condensing the exhaust, and for diagnosing degradation in a catalyst based on the $NO_2$ ratio. However, since this technique requires a condensation apparatus for obtaining the condensate liquid and a pH sensor besides the $NO_x$ sensor, the overall system becomes complicated, which causes a problem with high cost.

SUMMARY

The present invention relates to a method for diagnosing a degree of degradation in a catalyst that oxidizes a predetermined gas component such as nitrogen monoxide.

According to the present invention, the method for diagnosing a degree of degradation in a catalyst that oxidizes a gas component contained in an exhaust gas discharged from an internal combustion engine, the catalyst being provided in an exhaust path of the internal combustion engine, the method includes: a) providing a diagnostic sensor downstream of the catalyst in the exhaust path, the diagnostic sensor being configured to output an electromotive force corresponding to a NO conversion rate as a diagnostic output; and b) diagnosing whether the catalyst has degraded beyond an acceptable limit by comparing the diagnostic output with a threshold value predetermined depending on a temperature of the catalyst, wherein the NO conversion rate is defined as a ratio of nitrogen monoxide that is oxidized by the catalyst and discharged downstream of the catalyst as nitrogen dioxide, with respect to nitrogen monoxide contained in the exhaust gas supplied upstream of the catalyst in the exhaust path.

According to the present invention, whether the oxidation catalyst has degraded can be diagnosed in real time based on a diagnostic output from one diagnostic sensor.

Preferably, the diagnostic output from the diagnostic sensor increases as a concentration of the nitrogen monoxide in the exhaust gas increases and as a concentration of the nitrogen dioxide decreases.

Accordingly, whether the oxidation catalyst has degraded can be diagnosed based on a diagnostic output from one diagnostic sensor in real time and with superior accuracy.

Thus, the object of the present invention is to provide a method for diagnosing whether the oxidation catalyst has degraded, based on an output value from one diagnostic sensor with higher accuracy.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 schematically illustrates a configuration of a diesel engine system 1000 including an oxidation catalyst diagnosis system DS1;

DESCRIPTION OF THE PREFERRED EMBODIMENTS

Overview of System

Figure 2A:
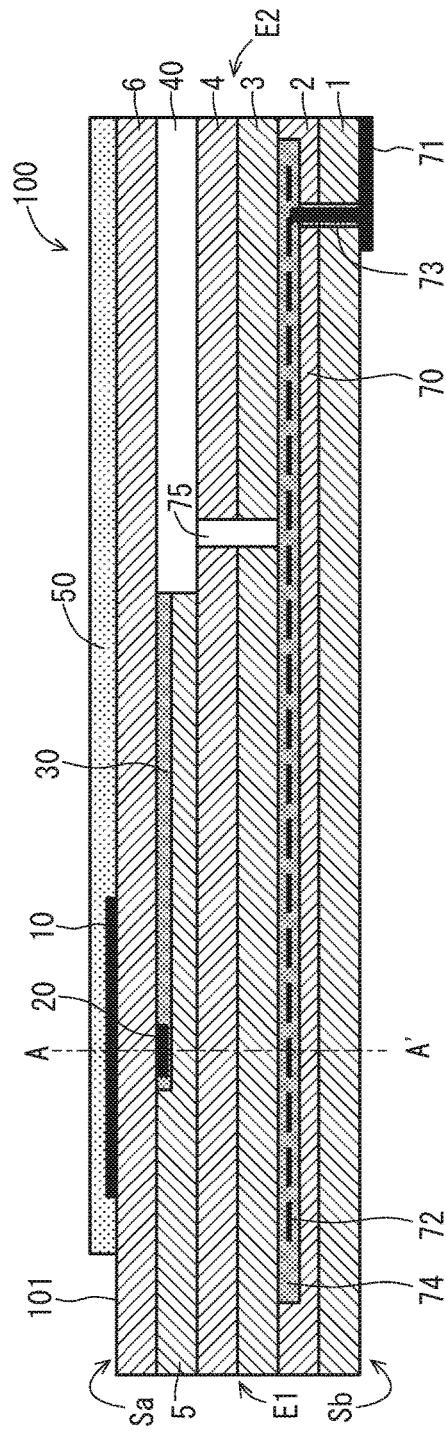
FIGS. 2A and 2B are schematic sectional views of an example configuration of a diagnostic sensor 100.

FIG. 1 schematically illustrates a configuration of a diesel engine system (hereinafter also merely referred to as an engine system) 1000 including an oxidation catalyst diagnosis system DS1 according to an embodiment of the present invention.

The oxidation catalyst diagnosis system DS1 mainly includes a zirconia sensor for diagnosing degradation in a catalyst (hereinafter also merely referred to as a diagnostic sensor) 100, and an electronic controller 200 that is a controller for controlling an operation of the entire engine system 1000.

The engine system 1000 mainly includes, in addition to the oxidation catalyst diagnosis system DS1, an engine main body 300 that is a diesel engine of one type of internal combustion engine, a plurality of fuel injection valves 301 that inject a fuel into the engine main body 300, a fuel injection instruction part 400 for instructing the fuel injection valves 301 to inject a fuel, an exhaust pipe 500 forming an exhaust path that externally discharges an exhaust gas (engine exhaust) G generated in the engine main body 300, and an oxidation catalyst 600 such as platinum or palladium that is provided at some midpoint of the exhaust pipe 500 and oxidizes a predetermined gas component (for example, nitrogen monoxide (NO)) in the exhaust gas G. In the present embodiment, in a relative meaning, the position closer to the engine main body 300 that is one side of the exhaust pipe 500 is referred to an upstream side, and the position closer to an exhaust port 510 that is opposite the engine main body 300 is referred to as a downstream side. Furthermore, the engine system 1000 may include one or a plurality of purification devices 700 at some midpoint of the exhaust pipe 500, in addition to the oxidation catalyst 600.

The engine system 1000 is typically mounted in a vehicle, and in such a case, the fuel injection instruction part 400 is an accelerator pedal.

In the engine system 1000, the electronic controller 200 issues a fuel injection instruction signal sg1 to the fuel injection valves 301. The fuel injection instruction signal sg1 is usually issued in response to a fuel injection request signal sg2 for demanding an injection of a predetermined amount of fuel, which is provided from the fuel injection instruction part 400 to the electronic controller 200 during the operation (action) of the engine system 1000 (e.g., an accelerator pedal is depressed so that an optimum fuel injection reflecting a large number of parameters, such as the position of an accelerator, an amount of oxygen intake, an engine speed, and torque is demanded). In addition to this, the fuel injection instruction signal sg1 may be issued for the oxidation catalyst diagnosis system DS1 to operate.

A monitor signal sg3 for monitoring various situations inside the engine main body 300 is provided from the engine main body 300 to the electronic controller 200.

In the engine system 1000, the exhaust gas G discharged from the engine main body 300 that is a diesel engine is a gas in an excessive oxygen ($O_2$) atmosphere having an oxygen concentration of approximately 10%, in addition to including, for example, carbon dioxide ($CO_2$), soot (graphite), $NO_x$ (nitrogen oxide, mainly NO), and a hydrocarbon (HC), and contains NO the most except for $CO_2$ and $O_2$. Furthermore, a ratio of HC to $NO_x$ ranges approximately from HC:$NO_x$=1:1.8 (approximately under 200 C.°) to 1:10 (approximately under 400 C.°), depending on a temperature. $NO_x$ may be included in a larger ratio than these cases, depending on an operating state of the engine system 1000. In the specification, carbon monoxide (CO) is treated as a kind of HC, in addition to typical hydrocarbon gases (gases classified as hydrocarbons in terms of chemical formula) such as $C_2H_4$, $C_3H_6$, and n-C8.

The oxidation catalyst diagnosis system DS1 is targeted for a diagnosis of a degree of degradation in the oxidation catalyst 600 (more specifically, a degree of degradation in the oxidation ability of the oxidation catalyst 600). The oxidation catalyst 600 is provided to oxide a gas component to be processed (for example, NO and HC) that is a predetermined gas component in the exhaust gas G that has flowed from the upstream side to prevent the gas component to be processed from flowing out through the exhaust port 510 at the end of the exhaust pipe 500, but its oxidation ability degrades with time. The occurrence of such degradation is not preferable because it increases an amount of the gas component to be processed that is not captured by the oxidation catalyst 600 but flows downstream.

The oxidation catalyst diagnosis system DS1 according to the present embodiment diagnoses a degree of degradation in the oxidation ability of the oxidation catalyst 600 based on a degree of oxidation of NO by the oxidation catalyst 600, with attention given to NO that is one of the gas components to be processed and has a higher abundance ratio in the exhaust gas G.

In the present embodiment, a ratio of NO that is oxidized by the oxidation catalyst 600 and discharged downstream as nitrogen dioxide ($NO_2$) with respect to NO contained in the exhaust gas G and supplied upstream to the oxidation catalyst 600 is referred to as a NO conversion rate. The NO conversion rate can be obtained as a ratio of a difference between a NO concentration (N1) in the exhaust gas G that exists upstream of the oxidation catalyst 600 and a NO concentration (N2) in the exhaust gas G that exists downstream of the oxidation catalyst 600, with respect to the NO concentration (N1). Thus, the following equation holds:

$$\text{NO Conversion Rate (\%)} = 100 \times (N1-N2)/N1.$$

Degradation in the oxidation ability of the oxidation catalyst 600 also means decrease in the NO conversion rate.

In the diagnosis of degradation, a diagnostic sensor 100 that yields an output corresponding to an abundance ratio of NO to $NO_2$ obtained by oxidizing NO is used. The diagnostic sensor 100 is disposed downstream of the oxidation catalyst 600 in the exhaust pipe 500, with one of its ends inserted into the exhaust pipe 500.

The output from the diagnostic sensor 100 is given to the electronic controller 200 as a diagnosis detection signal sg11. In the oxidation catalyst diagnosis system DS1, the electronic controller 200 is configured to diagnose whether the oxidation catalyst 600 has degraded or not on the basis of the diagnosis detection signal sg11 issued from the diagnostic sensor 100. An example configuration of the diagnostic sensor 100 and details of the diagnosis of degradation will be described later.

Alternatively, the oxidation catalyst diagnosis system DS1 may include a temperature sensor 110 that is disposed upstream of the oxidation catalyst 600 and detects a temperature (exhaust temperature) of the exhaust gas G in the relevant portion. The temperature sensor 110 may be a conventionally known sensor as one used to measure an exhaust temperature in a common engine system. The temperature sensor 110 is also disposed with one of its ends inserted into the exhaust pipe 500, similarly as the diagnostic sensor 100. The temperature sensor 110 intended for a use other than the diagnosis of degradation in the oxidation catalyst 600 may be used for this diagnosis of degradation.

When the oxidation catalyst diagnosis system DS1 includes the temperature sensor 110, the electronic controller 200 obtains an exhaust temperature detection signal sg12 issued from the temperature sensor 110 to identify an exhaust temperature. Such an exhaust temperature is regarded as a temperature of the oxidation catalyst 600 at that point of time.

The electronic controller 200 includes storage (not shown) such as memory or HDD, and the storage stores a program for controlling the operations of the engine system 1000 and the oxidation catalyst diagnosis system DS1, and also stores threshold information used to diagnose a degree of degradation in the oxidation catalyst 600 which will be described below.

Example Configuration of Diagnostic Sensor

Figure 2B:
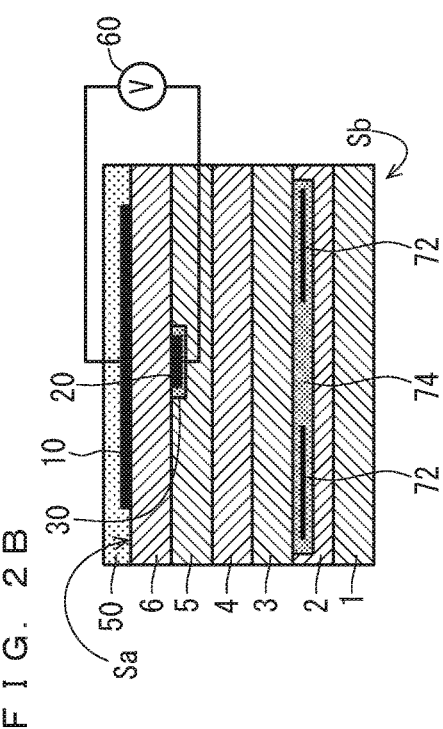

FIGS. 2A and 2B are schematic sectional views of an example configuration of the diagnostic sensor 100 used in the present embodiment. FIG. 2A is a vertical sectional view of a sensor element 101, which is a main component of the diagnostic sensor 100, taken along the longitudinal direction of the sensor element 101. FIG. 2B is a view including a cross-section of the sensor element 101 perpendicular to the longitudinal direction of the sensor element 101 at a position A-A' of FIG. 2A.

The diagnostic sensor 100 used in the present embodiment is a generally called mixed-potential type gas sensor. Generally speaking, the diagnostic sensor 100 determines a concentration of a gas component in a measurement gas, using a potential difference that occurs between a sensing electrode 10, which is provided on the surface of the sensor element 101 mainly made of zirconia ($ZrO_2$) ceramics that is an oxygen-ion conductive solid electrolyte, and a reference electrode 20, which is provided inside the sensor element 101, due to a difference in the concentration of the gas component between portions near the electrodes on the basis of the principle of mixed potential.

The sensor element 101 mainly includes a reference gas introduction layer 30, a reference gas introduction space 40, and a surface protective layer 50 in addition to the sensing electrode 10 and the reference electrode 20 described above.

In the present embodiment, the sensor element 101 has a structure in which six layers, namely, a first solid electrolyte layer 1, a second solid electrolyte layer 2, a third solid electrolyte layer 3, a fourth solid electrolyte layer 4, a fifth solid electrolyte layer 5, and a sixth solid electrolyte layer 6, each formed of an oxygen-ion conductive solid electrolyte, are laminated in the stated order from the bottom side of FIGS. 2A and 2B. The sensor element 101 additionally includes other components mainly between these layers or on an outer surface of the element. The solid electrolytes constituting these six layers are fully airtight. Such a sensor element 101 is manufactured by, for example, laminating ceramic green sheets corresponding to the individual layers, which have been subjected to a predetermined process and printing of a circuit pattern, and further, by integrating the laminated layers through firing.

In the following description, for the sake of convenience, the surface located as the upper surface of the sixth solid electrolyte layer 6 in FIGS. 2A and 2B is referred to as a front surface Sa of the sensor element 101, and the surface located as the lower surface of the first solid electrolyte layer 1 in FIGS. 2A and 2B is referred to as a rear surface Sb of the sensor element 101. In the determination of the concentration of an unburned hydrocarbon gas in a measurement gas with the diagnostic sensor 100, a predetermined range starting from a distal end E1 being one end of the sensor element 101, which includes at least the sensing electrode 10, is disposed in a measurement gas atmosphere, and the other portion including a base end E2 opposite the distal end E1 is disposed so as not to be in contact with the measurement gas atmosphere.

The sensing electrode 10 is an electrode for sensing a measurement gas. The sensing electrode 10 is formed as a porous cermet electrode made of Pt containing a predetermined ratio of Au, namely, a Pt—Au alloy and zirconia. The sensing electrode 10 is provided in a substantially rectangular shape in plan view at a position closer to the distal end E1 that is one end in the longitudinal direction of the sensor element 101 on the front surface Sa.

The catalytic activity of the sensing electrode 10 against NO and $NO_2$ is disabled by preferably determining the composition of the Pt—Au alloy being its constituent material. That is, the decomposition reaction of NO and $NO_2$ is prevented or reduced in the sensing electrode 10. In the diagnostic sensor 100, accordingly, the potential of the sensing electrode 10 varies in accordance with the NO and $NO_2$ concentrations in the measurement gas.

The catalytic activity of the sensing electrode 10 is disabled by containing gold (Au) as a conductive component (noble metal component) of the sensing electrode 10, in addition to platinum (Pt) that is a main component. Specifically, the sensing electrode 10 is formed such that the ratio of Au (Au abundance ratio) in the sensing electrode 10 is 0.3 or more. In this specification, the Au abundance ratio means an area ratio of the portion covered with Au to the portion at which Pt is exposed in the surface of the noble metal particle of the sensing electrode 10. The Au abundance ratio is 1 when the area of the portion at which Pt is exposed is equal to the area of the portion covered with Au. In this specification, an Au abundance ratio is calculated from a peak intensity of a peak detected for Au and Pt, obtained using X-ray photoelectron spectroscopy (XPS), by a relative sensitivity coefficient method.

When the Au abundance ratio is 0.3 or more, in the sensing electrode 10, Au is enriched in the surface of the noble metal particle of the sensing electrode 10. More specifically, an Au-rich Pt—Au alloy is formed near the surface of a Pt-rich Pt—Au alloy particle. When such a state is achieved, the catalytic activity in the sensing electrode 10 is disabled preferably, and the dependence (sensitivity) of the potential of the sensing electrode 10 on the NO and $NO_2$ concentrations is enhanced.

It suffices that the volume ratio between a noble metal component and zirconia of the sensing electrode 10 is approximately from 5:5 to 8:2.

For the diagnostic sensor 100 to preferably exhibit its function, the porosity of the sensing electrode 10 is preferably 10% or more and 30% or less, and the thickness of the sensing electrode 10 is preferably 5 μm or more. In particular, the porosity is more preferably 15% or more and 25% or less, and the thickness is more preferably 25 μm or more and 45 μm or less.

The plane size of the sensing electrode 10 may be determined appropriately, and it suffices that, for example, the length in the longitudinal direction of the sensor element is approximately 0.2 mm to 10 mm and the length perpendicular to the longitudinal direction is approximately 1 mm to 5 mm.

The reference electrode 20 is an electrode having a substantially rectangular shape in plan view, which is provided inside the sensor element 101 and serves as a reference in the determination of the concentration of the measurement gas. The reference electrode 20 is provided as a porous cermet electrode of Pt and zirconia.

It suffices that the reference electrode 20 has a porosity of 10% or more and 30% or less and a thickness of 5 μm or more and 15 μm or less. The plane size of the reference electrode 20 may be smaller than that of the sensing electrode 10 as illustrated in FIGS. 2A and 2B, or may be equal to that of the sensing electrode 10.

The reference gas introduction layer 30 is a layer made of porous alumina, which is provided inside the sensor element 101 to cover the reference electrode 20. The reference gas introduction space 40 is an internal space provided on the base end E2 of the sensor element 101. Air (oxygen) serving as a reference gas is externally introduced into the reference gas introduction space 40.

The reference gas introduction space 40 and the reference gas introduction layer 30 are in communication with each other, and accordingly, in the use of the diagnostic sensor 100, the surrounding of the reference electrode 20 is always filled with air (oxygen) through the reference gas introduction space 40 and the reference gas introduction layer 30. During the use of the diagnostic sensor 100, thus, the reference electrode 20 always has a constant potential.

The reference gas introduction space 40 and the reference gas introduction layer 30 are provided so as not to come into contact with a measurement gas owing to their surrounding solid electrolytes. This prevents the reference electrode 20 from coming into contact with the measurement gas even if the sensing electrode 10 is exposed to the measurement gas.

In the case illustrated in FIG. 2A, the reference gas introduction space 40 is provided in such a manner that part of the fifth solid electrolyte layer 5 is in communication with the exterior on the base end E2 of the sensor element 101. The reference gas introduction layer 30 is provided so as to extend in the longitudinal direction of the sensor element 101 between the fifth solid electrolyte layer 5 and the sixth solid electrolyte layer 6. The reference electrode 20 is provided under the center of gravity of the sensing electrode 10 with reference to FIGS. 2A and 2B.

The surface protective layer 50 is a porous layer made of alumina, which is provided so as to cover at least the sensing electrode 10 on the front surface Sa of the sensor element 101. The surface protective layer 50 is provided as an electrode protective layer that prevents or reduces the degradation in the sensing electrode 10 due to continuous exposure to a measurement gas during the use of the diagnostic sensor 100. In the case illustrated in FIG. 2A, the surface protective layer 50 is provided so as to cover not only the sensing electrode 10 but also substantially the entire front surface Sa of the sensor element 101 except for a predetermined range starting from the distal end E1.

As illustrated in FIG. 2B, the diagnostic sensor 100 is equipped with a potentiometer 60 capable of measuring a potential difference between the sensing electrode 10 and the reference electrode 20. Although FIG. 2B simply illustrates wiring between the potentiometer 60 and each of the sensing electrode 10 and the reference electrode 20, in the actual sensor element 101, connection terminals (not shown) are provided correspondingly to the respective electrodes on the front surface Sa or the rear surface Sb on the base end E2 side, and wiring patterns (not shown), which connect the respective electrodes and their corresponding connection terminals, are formed on the front surface Sa and inside the element. The sensing electrode 10 and the reference electrode 20 are electrically connected with the potentiometer 60 through the wiring patterns and the connection terminals.

The sensor element 101 further includes a heater part 70, which performs temperature control of heating the sensor element 101 and maintaining the temperature of the sensor element 101, to enhance the oxygen ion conductivity of the solid electrolytes. The heater part 70 includes a heater electrode 71, a heater 72, a through hole 73, a heater insulating layer 74, and a pressure diffusion hole 75.

The heater electrode 71 is an electrode formed while being in contact with the rear surface Sb of the sensor element 101 (in FIGS. 2A and 2B, the lower surface of the first solid electrolyte layer 1). The heater part 70 can be powered externally through the heater electrode 71 connected with an external power supply (not shown).

The heater 72 is an electric resistor provided inside the sensor element 101. The heater 72 is connected with the heater electrode 71 through the through hole 73 and generates heat by being powered externally via the heater electrode 71 to heat the solid electrolytes forming the sensor element 101 and maintain their temperatures.

In the case illustrated in FIGS. 2A and 2B, the heater 72 is buried while being vertically sandwiched between the second solid electrolyte layer 2 and the third solid electrolyte layer 3 so as to extend from the base end E2 to the position below the sensing electrode 10 near the distal end E1. This enables the adjustment of the entire sensor element 101 at a temperature at which the solid electrolytes are activated.

The heater insulating layer 74 is an insulating layer formed of an insulator such as alumina on the upper and lower surfaces of the heater 72. The heater insulating layer 74 is formed for electrical insulation between the second solid electrolyte layer 2 and the heater 72 and for electrical insulation between the third solid electrolyte layer 3 and the heater 72.

The pressure diffusion hole 75 is a part provided to penetrate the third solid electrolyte layer 3 and the fourth solid electrolyte layer 4 and to be in communication with the reference gas introduction space 40, and is formed to mitigate an internal pressure rise associated with a temperature rise in the heater insulating layer 74.

In the diagnosis of a degree of degradation in the oxidation catalyst 600 using the diagnostic sensor 100 having the above configuration, as described above, air (oxygen) is supplied to the reference gas introduction space 40, with the sensor element 101 in only a predetermined range, which starts from the distal end E1 and includes at least the sensing electrode 10, being disposed in the exhaust pipe 500 of the engine system 1000, and with the sensor element 101 on the base end E2 being apart from the space. The heater 72 heats the sensor element 101 to an appropriate temperature from 300° C. to 800° C., preferably from 400° C. to 700° C., and more preferably from 400° C. to 600° C.

In such a state, a potential difference (electromotive force (EMF)) occurs between the sensing electrode 10 exposed to the measurement gas (exhaust gas G) and the reference electrode 20 disposed in the air atmosphere. According to the present embodiment, a difference in potential measured by the potentiometer 60 between the sensing electrode 10 and the reference electrode 20 is output as the diagnosis detection signal sg11. The potential difference may be referred to as a diagnostic sensor output.

As described above, while the potential of the reference electrode 20 disposed in the air atmosphere (with the concentration of oxygen maintained constant) is maintained constant, the potential of the sensing electrode 10 has a dependence on respective concentrations of NO and $NO_2$ in the measurement gas (exhaust gas G). Accordingly, the diagnostic sensor output varies according to the NO and $NO_2$ concentrations. When a measurement gas contains both NO and $NO_2$, the diagnostic sensor output yields a value corresponding to an abundance ratio of NO to $NO_2$. The oxidation catalyst diagnosis system DS1 according to the present embodiment diagnoses the degradation in the oxidation catalyst 600 using the dependence of the diagnostic sensor output on the abundance ratio (component ratios) of NO to $NO_2$ in the exhaust gas G, which will be described later.

Degradation in Oxidation Catalyst and Output Behavior of Diagnostic Sensor

Figure 3A:
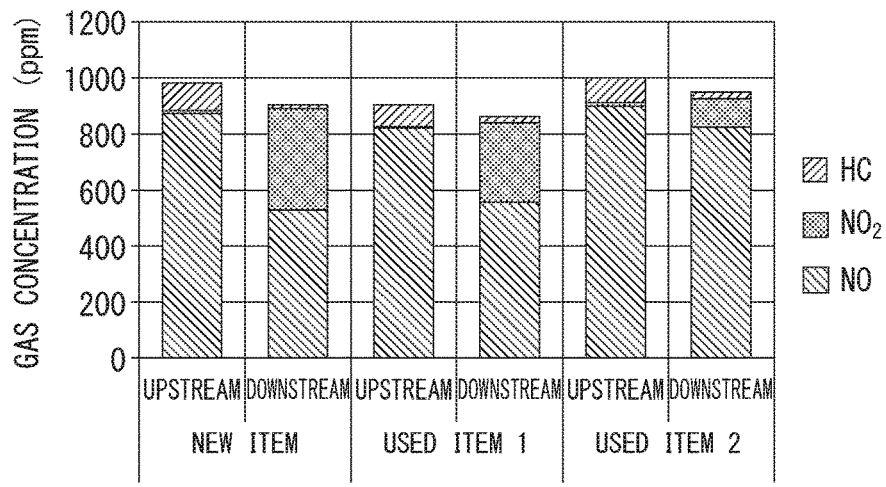
FIGS. 3A to 3C exemplify the situation of progress of degradation in an oxidation catalyst 600.
Figure 3B:
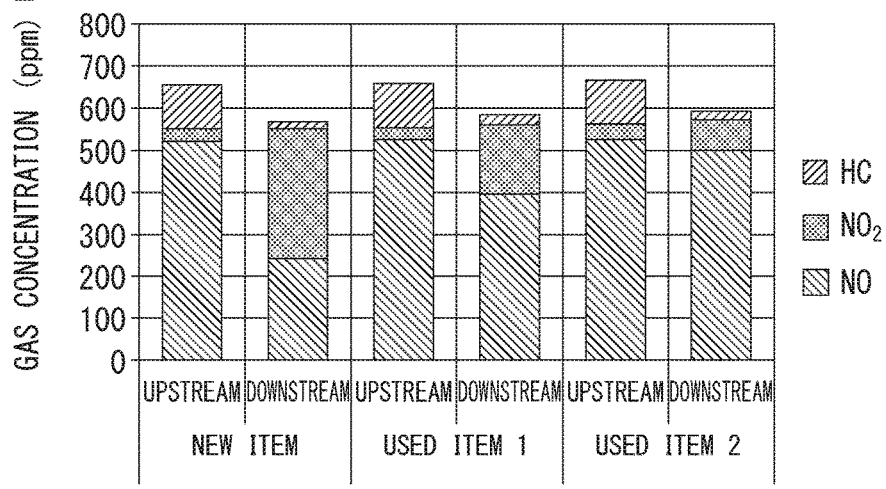
Figure 3C:
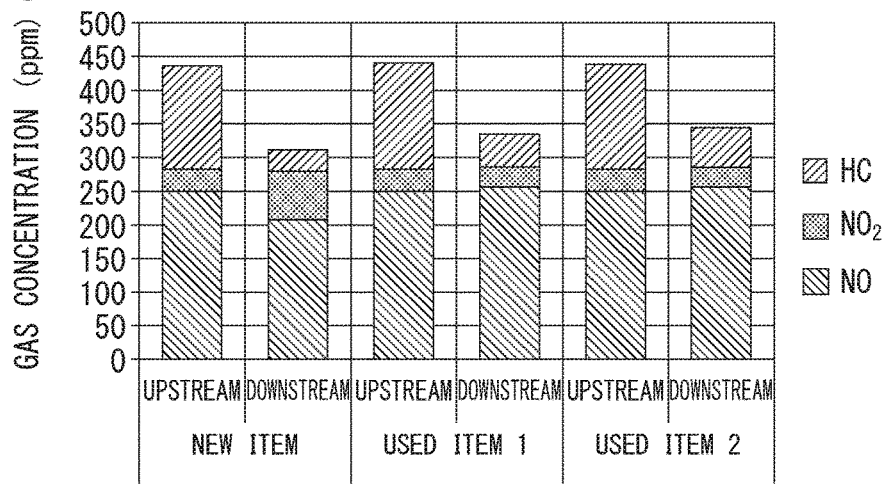

FIGS. 3A to 3C exemplify the situation of progress of degradation in the oxidation catalyst 600. Specifically, FIGS. 3A to 3C illustrate respective component ratios of the exhaust gas G upstream and downstream of each of three oxidation catalysts 600 which differ in used times. FIGS. 3A, 3B, and 3C illustrate evaluation results when the temperatures of the exhaust gas G are 400° C., 300° C., and 200° C., respectively. The operating conditions of the engine main body 300 are conditions on the temperatures that are listed in TABLE 1 to be described later.

More specifically, FIGS. 3A to 3C illustrate results of components of the exhaust gas G measured upstream and downstream of those three oxidation catalysts 600, wherein a "NEW ITEM" indicates the one that has been first used, a "USED ITEM 1" indicates the one that has been continuously used, and a "USED ITEM 2" indicates the one that has been used longer than the "USED ITEM 1". Here, those three oxidation catalysts 600 are of the same type (structure). Furthermore, the gas components illustrated in those figures are limited to NO, $NO_2$, and HC that are mainly relevant to the oxidation ability of the oxidation catalysts 600. The reason why the degree of degradation in the oxidation catalyst 600 can be evaluated from a component ratio of the exhaust gas G at the downstream side but the oxidation catalyst 600 was also measured upstream is because the component ratios of the exhaust gas G before introduction to the oxidation catalysts 600 were checked.

First, as for the cases that the temperatures of the exhaust gas G are 400° C. and 300° C. shown in FIGS. 3A and 3B, the concentrations of the gas components measured upstream are almost the same among the "NEW ITEM", the "USED ITEM 1", and the "USED ITEM 2". This means that the exhaust gas G reaches the oxidation catalyst 600 with an approximately equal component ratio since the engine main body 300 is operated under the same conditions. FIG. 3A exhibits approximately $HC:NO_x=1:10$ when the temperature of the exhaust gas G is 400° C., whereas FIG. 3B exhibits approximately $HC:NO_x=1:5$ when the temperature of the exhaust gas G is 300° C.

In contrast, at the downstream side of each catalyst, though the concentration of NO is smaller than those at the upstream side while $NO_2$, which is rarely present at the upstream side, is abundant, the concentration of NO increases and the concentration of $NO_2$ decreases in ascending order of the "NEW ITEM", the "USED ITEM 1", and the "USED ITEM 2". This means increasing of a ratio of NO that is discharged downstream as it is to the total amount of NO introduced upstream to the oxidation catalyst 600, that is, decreasing of the NO conversion rate. Such a tendency demonstrates that the degradation in the catalytic ability (oxidation ability) of the oxidation catalyst 600 proceeds as the oxidation catalyst 600 is used.

As seen from FIGS. 3A and 3B, even when the oxidation catalyst 600 is the "NEW ITEM", it cannot oxidize all the NO supplied upstream thereof. The NO conversion rate when the oxidation catalyst 600 is the "NEW ITEM" is approximately 55% at the maximum.

Both FIGS. 3A and 3B illustrate that the concentrations of HC at the downstream side are smaller than those at the upstream side and thus the ratios to the entire $NO_x$ at the downstream side are much smaller than those at the upstream side. For example, the "USED ITEM 1" at the downstream side in FIG. 3A exhibits approximately $HC:NO_x=1:42$. Furthermore, the concentrations of HC at the downstream side do not exhibit prominent change over time unlike NO. This means that the oxidation ability is sufficiently reserved for HC even when the oxidation ability for NO degrades and accordingly, in a state where degradation in the oxidation catalysts 600 against NO is troublesome, the component ratios of the exhaust gas G at the downstream side of the oxidation catalysts 600 are values almost reflecting the oxidation ability (in other words, the NO conversion rate) of NO in the oxidation catalysts 600.

In the case that the temperature of the exhaust gas G is 200° C. shown in FIG. 3C, although only the "NEW ITEM" exhibits a larger concentration of $NO_2$ at the downstream side than that at the upstream side, there is almost no difference in concentrations of NO to $NO_2$ between the downstream and upstream sides, as for the "USED ITEM 1" and the "USED ITEM 2". The reason is considered that since the temperature of the oxidation catalyst 600 is insufficient for activation, the oxidation ability against NO degrades at a relatively earlier use stage. On the other hand, due to a higher concentration of HC at the upstream side, the concentrations of HC at the downstream side shown in FIG. 3C are higher than those in FIGS. 3A and 3B, and increase in ascending order of the "NEW ITEM", the "USED ITEM 1", and the "USED ITEM 2". Nonetheless, the ratio of HC at the downstream side to the total $NO_x$ tends to be sufficiently smaller, similarly as the cases where the temperatures of the exhaust gas G are 400° C. and 300° C. Thus, this means that the component ratios of the exhaust gas G at the downstream side of the oxidation catalysts 600 are values almost reflecting the oxidation ability (in other words, the NO conversion rate) of NO even when the temperature of the exhaust gas G is 200° C., though the influence of HC is larger.

In view of such situations of progress of the degradation in the oxidation catalyst 600, the oxidation catalyst diagnosis system DS1 according to the present embodiment diagnoses a degree of the degradation in the oxidation catalyst 600, based on a value of the diagnostic sensor output which is obtained from the diagnostic sensor 100 and depends on concentrations of NO and $NO_2$, with disposition of the diagnostic sensor 100 downstream of the oxidation catalyst 600.

Figure 4A:
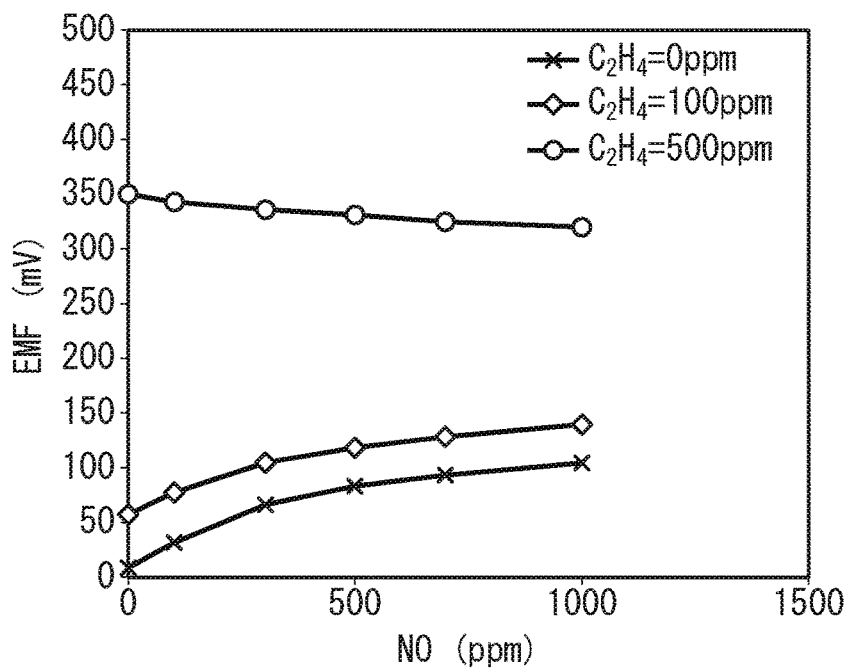
FIGS. 4A and 4B exemplify the dependence of a diagnostic sensor output from the diagnostic sensor 100 on NO and $NO_2$ concentrations.
Figure 4B:
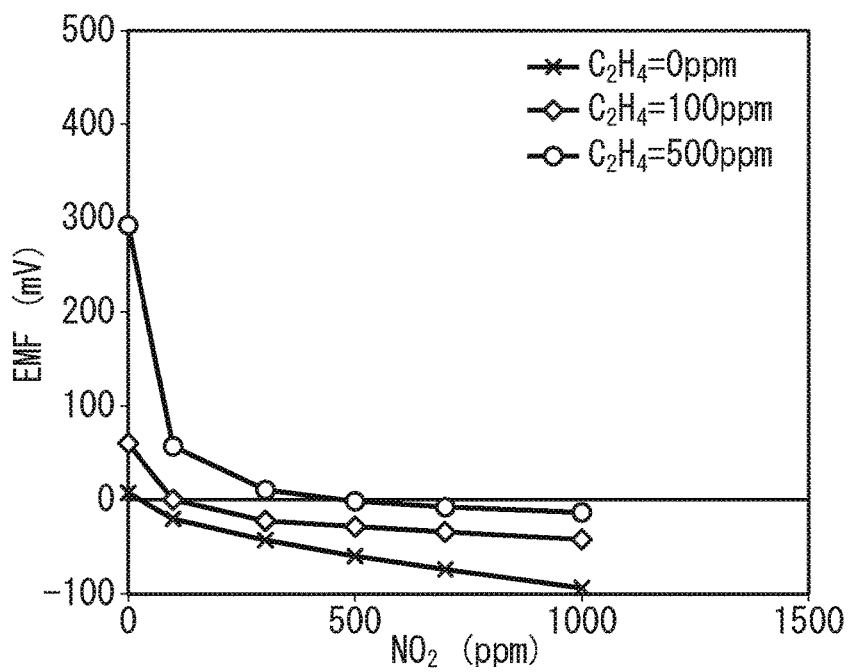

FIGS. 4A and 4B exemplify the dependence of the diagnostic sensor output (EMF) from the diagnostic sensor 100 on the NO and $NO_2$ concentrations. The total 18 kinds of evaluation gases with the following compositions (volume ratios) were used.

NO or $NO_2$: 0 ppm, 100 ppm, 300 ppm, 500 ppm, 700 pm, or 1000 ppm;
$C_2H_4$: 0 ppm, 100 ppm, or 500 ppm;
$O_2$: 10%; and
$N_2$: the residue.

$C_2H_4$ is contained as HC. Furthermore, the temperature (catalyst temperature) of the gases was set to 300° C. In the sensor element 101, the sensing electrode 10 whose Au abundance ratio is 0.3 or more was used.

The diagnostic sensor output from the diagnostic sensor 100 tends to increase as the NO concentration increases in a range where HC is sufficiently less as illustrated in FIG. 4A, and tends to increase as the $NO_2$ concentration decreases as illustrated in FIG. 4B.

In other words, as seen from the dependence on the concentrations illustrated in FIGS. 4A and 4B, both of increase in NO and decrease in $NO_2$ contribute to increase in the diagnostic sensor output from the diagnostic sensor 100, though the ratio of NO in the exhaust gas G at the downstream side increases and the ratio of $NO_2$ decreases as the degradation in the oxidation catalyst 600 progresses as illustrated in FIGS. 3A to 3C. This means that the diagnostic sensor output from the diagnostic sensor 100 has superior sensitivity to the progress of degradation in the oxidation ability of the oxidation catalyst 600, particularly, to the progress of degradation in the oxidation ability against NO (in other words, decrease in the NO conversion rate).

In addition, although increase in the concentration of HC greatly influences the value of the diagnostic sensor output according to FIGS. 4A and 4B, the concentration of HC at the downstream side of the oxidation catalyst 600 is sufficiently lower than that of $NO_x$ as illustrated in FIGS. 3A to 3C. An example ratio is approximately $HC:NO_x=1:6$ even in FIG. 3C where the concentration of HC is relatively higher and the temperature of the exhaust gas G is 200° C. Thus, it is less necessary to consider the influence of the concentration of HC in diagnosing the degradation, and the diagnostic sensor output can be regarded as reflecting a degree of the degradation in the oxidation ability of the oxidation catalyst 600 against NO (in other words, a degree of decrease in the NO conversion rate).

Figure 5:
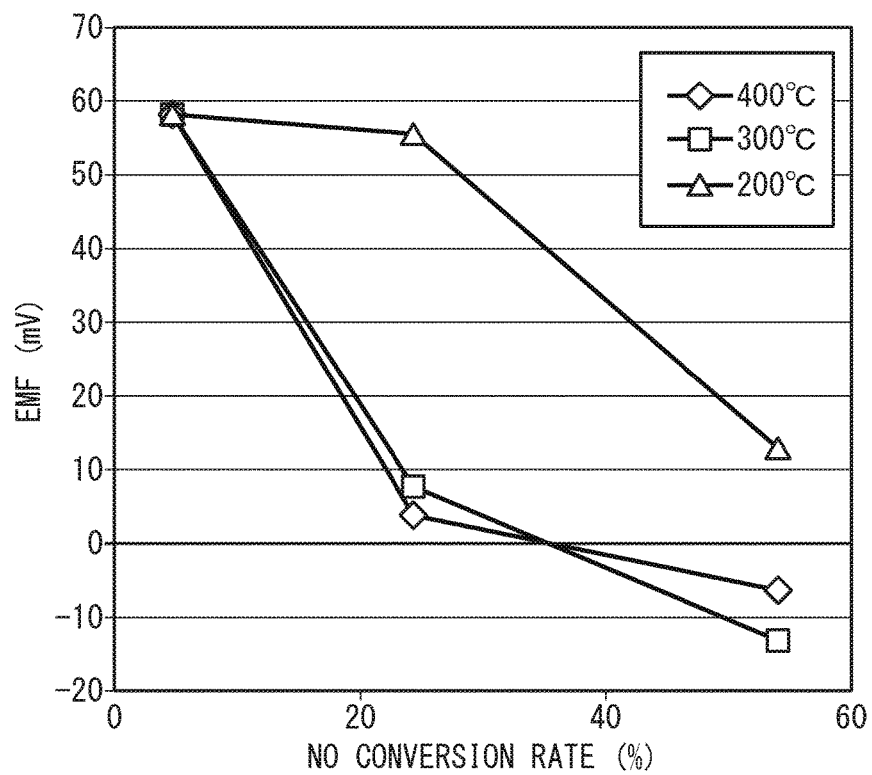
FIG. 5 exemplifies a relationship between a NO conversion rate and the diagnostic sensor output.

FIG. 5 exemplifies a relationship between the NO conversion rate and the diagnostic sensor output. FIG. 5 confirms that the diagnostic sensor output has a tendency to increase as the NO conversion rate is lower, irrespective of a temperature of the oxidation catalyst 600.

Thus, in the oxidation catalyst diagnosis system DS1 according to the present embodiment with disposition of the diagnostic sensor 100 downstream of the oxidation catalyst 600 as illustrated in FIG. 1, the diagnostic sensor output from the diagnostic sensor 100 reflects a degree of the degradation in the oxidation ability of the oxidation catalyst 600. Thus, it is possible, in principle, to compare the diagnostic sensor output with a predetermined threshold value and diagnose that the oxidation catalyst 600 is deteriorated beyond an acceptable limit (to an extent requiring replacement) if the diagnostic sensor output exceeds the threshold value.

More specifically, as seen from the differences between the "NEW ITEMs" in component ratio at the downstream side as illustrated in, for example, FIGS. 3A to 3C, the oxidation ability of the oxidation catalyst 600 differs depending on a temperature of the exhaust gas G, and thus, a threshold value serving as a reference for diagnosing whether the oxidation catalyst 600 has degraded needs to be changed according to the temperature of the exhaust gas G. Since, in effect, the temperature of the exhaust gas G reaching the oxidation catalyst 600 is regarded as the temperature of the oxidation catalyst 600, the temperature of the exhaust gas G may be referred to as the temperature of the oxidation catalyst 600 in the following description. As described above when the oxidation catalyst diagnosis system DS1 includes the temperature sensor 110, the temperature of the oxidation catalyst 600 is identified based on the exhaust temperature detection signal sg12 output by the temperature sensor 110.

In view of such difference in oxidation ability depending on a temperature of the oxidation catalyst 600, in the oxidation catalyst diagnosis system DS1 according to the present embodiment, a relationship between the temperature of the oxidation catalyst 600 and a threshold value of the diagnostic sensor output for the temperature is predetermined and stored as threshold information in the storage of the electronic controller 200. Then, for the degradation diagnosis, the temperature of the oxidation catalyst 600 is identified, and the degradation diagnosis is made using a threshold value for the identified temperature. The threshold information does not have any particular limitation on its format as long as it is compared with a value of the diagnostic sensor output that is given as the diagnosis detection signal g11.

Figure 6:
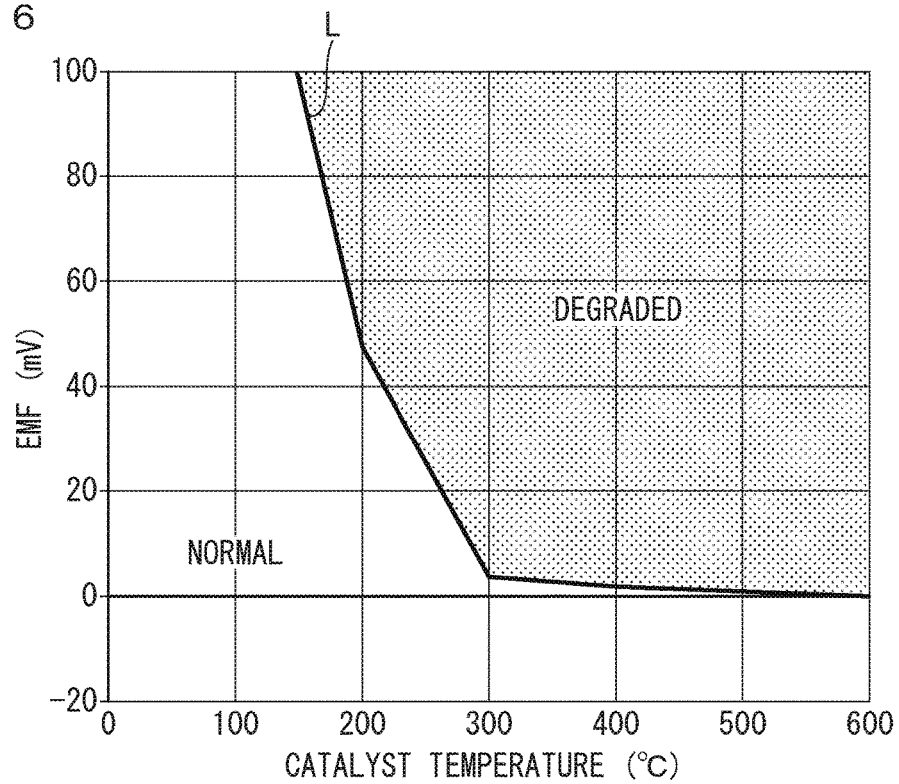
FIG. 6 exemplifies a threshold map indicating a relationship between a temperature of the oxidation catalyst 600 and the diagnostic sensor output.

FIG. 6 exemplifies a threshold map illustrated based on the threshold information and indicating the relationship between the temperature of the oxidation catalyst 600 (horizontal axis) and the diagnostic sensor output (vertical axis). More specifically, the threshold information to be the basis for the threshold map shown in FIG. 6 is intended to set a value of the diagnostic sensor output (EMF) when the NO conversion rate is 30% as a threshold value, and is obtained by operating the engine system 1000 incorporating the oxidation catalyst 600 whose NO conversion rate is 30%, under five operation conditions for achieving different temperatures (150° C., 200° C., 300° C., 400° C., and 500° C.) of the oxidation catalyst 600 which are listed in TABLE 1 below.

TABLE 1

| ENGINE SPEED (rpm) | λ | AMOUNT OF AIR INTAKE (kg/h) | CATALYST TEMPERATURE (° C.) |
|---|---|---|---|
| 1600 | 1.21 | 145 | 500 |
| 1600 | 1.58 | 131 | 400 |
| 1600 | 2.22 | 117 | 300 |
| 1600 | 4.02 | 103 | 200 |
| 1600 | 5.48 | 95 | 150 |

According to the threshold map in FIG. 6, the oxidation catalyst 600 is diagnosed as having degraded to an extent that the NO conversion rate falls under 30% (beyond an acceptable limit) when a value of the diagnostic sensor output is larger than a value on a boundary L, whereas the oxidation catalyst 600 is diagnosed as having no problem in using it even with slight degradation, and being normal when a value of the diagnostic sensor output is smaller than or equal to a value on the boundary L.

When an actual degradation diagnosis is made, it is preferred that a temperature of the oxidation catalyst 600 is identical to a temperature for which the threshold information has been defined. However, when a temperature of the oxidation catalyst 600 is another temperature, interpolation may be appropriately performed on the temperature based on the threshold information to identify a threshold value for the temperature. Alternatively, when a value of the diagnostic sensor output to be a threshold value is regarded almost constant with respect to the temperature of the oxidation catalyst 600 as in a range higher than or equal to 300° C. in the threshold map of FIG. 6, one threshold value may be set for the temperature range.

Example of Diagnosis Procedure

Figure 7:
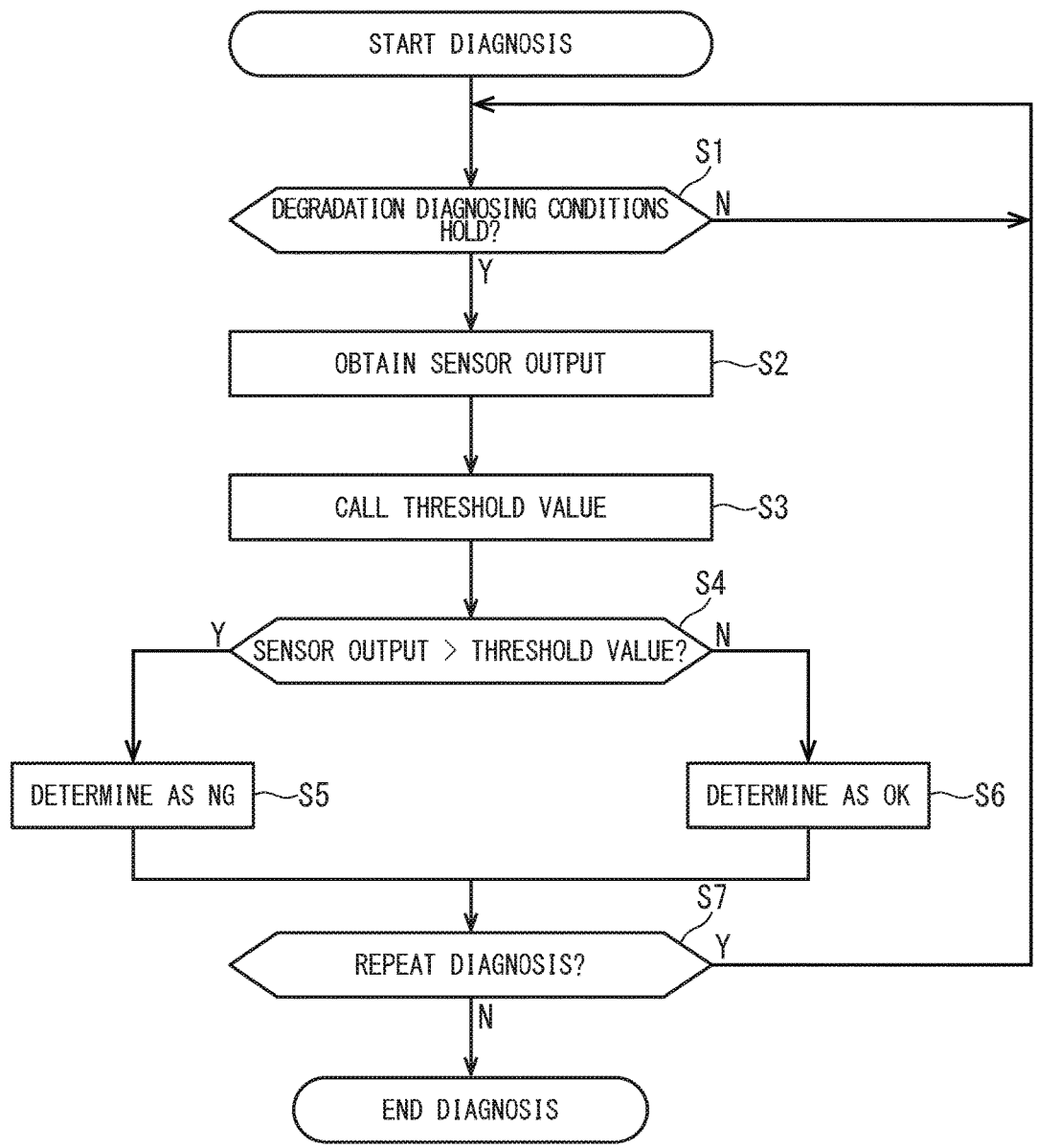
FIG. 7 illustrates an example procedure of a degradation diagnosis.

FIG. 7 illustrates an example procedure of a degradation diagnosis to be made in the present embodiment. The degradation diagnosis in the present embodiment starts first from checking by the electronic controller 200 whether degradation diagnosing conditions hold, under the condition that the engine system 1000 is operating (step S1). The degradation diagnosing conditions includes the following three conditions:

The first condition: the temperature of the oxidation catalyst 600 falls within a predetermined temperature range (e.g., 300° C. to 400° C.);

The second condition: the engine main body 300 is in a predetermined operating state (operating conditions such as an engine speed, an amount of air, an amount of injection, injection timing, and EGR satisfy a predetermined condition range); and The third condition: the $NO_x$ concentration at the upstream side of the oxidation catalyst 600 falls within a predetermined range (e.g., 500 ppm±25 ppm).

Among these, the first condition may be judged based on a measurement value of the temperature sensor 110. Alternatively, the first and second conditions may be set so that the temperature of the oxidation catalyst 600 when the second condition holds falls within a temperature range defined under the first condition, and the first condition may establish itself when the second condition holds.

Furthermore, the second condition may hold by operating the engine main body 300 under the conditions identical to those for obtaining the threshold information as indicated in, for example, TABLE 1.

Moreover, the third condition establishes itself when the second condition holds, because the $NO_x$ concentration at the upstream side of the oxidation catalyst 600 is almost uniquely determined once an operating state of the engine main body 300 is fixed. In spite of this, a $NO_x$ sensor may be provided upstream of the oxidation catalyst 600 to check whether the third condition holds, based on its measurement value. The $NO_x$ sensor may be provided downstream of the oxidation catalyst 600 because the $NO_x$ concentration does not change between the upstream side and the downstream side of the oxidation catalyst 600.

While the degradation diagnosing conditions do not hold (No in step S1), the subsequent processes are suspended. If the degradation diagnosing conditions hold (Yes in step S1), the electronic controller 200 obtains from the diagnostic sensor 100 the diagnosis detection signal sg11, that is, the diagnostic sensor output (step S2). Furthermore, the electronic controller 200 calls a threshold value matching the held degradation diagnosing conditions (more specifically, matching the first condition) from the threshold information pre-stored in the storage (step S3).

Upon obtainment of the diagnostic sensor output and calling of the threshold value, the electronic controller 200 compares both of the values (step S4). If the diagnostic sensor output is larger than the threshold value (Yes in step S4), the oxidation catalyst 600 is diagnosed as having degraded (NG) to an unacceptable extent (for example, requiring replacement) (step S5). If the diagnostic sensor output is smaller than or equal to the threshold value (No in step S4), the oxidation catalyst 600 is diagnosed as not having degraded (OK) (step S6).

If the diagnosis is repeated after the end of the diagnosis irrespective of being diagnosed as NG or OK (Yes in step S7), the processes are repeated from the checking whether the degradation diagnosing conditions hold. If not, the diagnosis ends immediately (No in step S7).

As described above, according to the present embodiment, a degree of degradation in the oxidation ability of an oxidation catalyst that is provided at some midpoint of an exhaust pipe connected from an engine main body being a diesel engine in an engine system and that oxidizes a predetermined gas component contained in an exhaust gas is diagnosed, based on an output value of a diagnostic sensor that is provided downstream of the oxidation catalyst and that yields an output corresponding to a NO conversion rate of the oxidation catalyst. Accordingly, without using any output value from a plurality of sensors, whether the oxidation catalyst has degraded can be diagnosed based on an output value from one sensor. Furthermore, since an output from the diagnostic sensor increases as NO increases and as $NO_2$ decreases, the diagnostic sensor has superior sensitivity to the degradation in the oxidation catalyst. Thus, according to the present embodiment, whether the oxidation catalyst has degraded can be diagnosed in real time and with superior accuracy.

While the invention has been shown and described in detail, the foregoing description is in all aspects illustrative and not restrictive. It is therefore understood that numerous modifications and variations can be devised without departing from the scope of the invention.

What is claimed is:

1. A method for diagnosing a degree of degradation in a catalyst that oxidizes a gas component contained in an exhaust gas discharged from an internal combustion engine, said catalyst being provided in an exhaust path of said internal combustion engine, said method comprising the steps of:
    a) providing a diagnostic sensor disposed downstream of said catalyst in said exhaust path, said diagnostic sensor being connected to a controller having a storage and being configured to output an electromotive force corresponding to an NO conversion rate as a diagnostic output; and
    b) diagnosing, by said controller, whether said catalyst has degraded beyond an acceptable limit by comparing said diagnostic output with a threshold value stored in said storage that is predetermined depending on a temperature of said catalyst,
    wherein said NO conversion rate is defined as a ratio of nitrogen monoxide that is oxidized by said catalyst and discharged downstream of said catalyst as nitrogen dioxide, with respect to nitrogen monoxide contained in said exhaust gas supplied upstream of said catalyst in said exhaust path; and
    c) checking, by said controller, whether degradation diagnosing conditions hold, before performing said diagnosing by said controller in said step (b),
    wherein said degradation diagnosing conditions include the following first to third conditions:
        said first condition: said temperature of said catalyst falls within a predetermined temperature range;
        said second condition: said internal combustion engine is in a predetermined operating state; and
        said third condition: a concentration of nitrogen oxide upstream of said catalyst in said exhaust path falls within a predetermined range,
    said degree of degradation in said catalyst being diagnosed by said controller in said step (b) based on a value of said threshold value and said diagnostic output, after checking by said controller in said step (c) that said degradation diagnosing conditions hold,
    said threshold value being defined based on an acceptable limit of said NO conversion rate, and said threshold value being determined for said predetermined temperature range defined under said first condition, and
    in said step (b):
        said catalyst being diagnosed by said controller as not having degraded beyond said acceptable limit when said diagnostic output is smaller than or equal to said threshold value; and
        said catalyst being diagnosed by said controller as having degraded beyond said acceptable limit when said diagnostic output is larger than said threshold value.

2. The method according to claim 1,
wherein said exhaust gas is a gas in an excessive oxygen atmosphere, and contains a hydrocarbon (HC) and nitrogen oxide ($NO_x$) in an abundance ratio of $HC:NO_x$=1:1.8 to 1:10.

3. The method according to claim 1,
wherein said diagnostic output from said diagnostic sensor increases as a concentration of said nitrogen monoxide in said exhaust gas increases and as a concentration of said nitrogen dioxide decreases.

4. The method according to claim 1,
wherein said diagnostic output from said diagnostic sensor increases as a concentration of said nitrogen monoxide in said exhaust gas increases and as a concentration of said nitrogen dioxide decreases.

5. The method according to claim 4,
wherein a mixed-potential type zirconia sensor is used in said diagnostic sensor, said zirconia sensor having a sensing electrode made of a Pt—Au alloy disabling a catalytic activity of said sensing electrode.

* * * * *